Aug. 21, 1923.
J. M. SANDERS
AUGER BIT
Filed Aug. 25, 1922
1,465,870
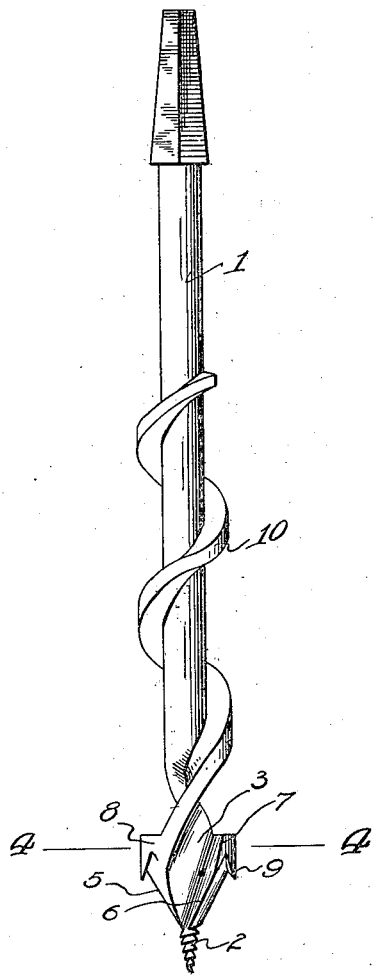
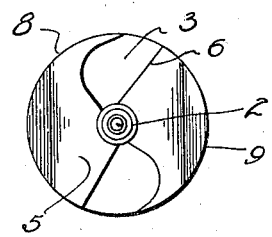
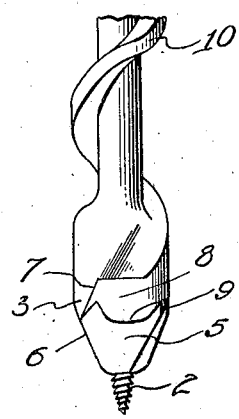
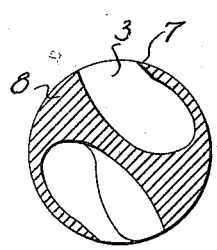
J.M. Sanders
INVENTOR
BY Victor J. Evans
ATTORNEY
WITNESS:

Patented Aug. 21, 1923.

1,465,870

UNITED STATES PATENT OFFICE.

JAMES M. SANDERS, OF HILLSBORO, OHIO.

AUGER BIT.

Application filed August 25, 1922. Serial No. 584,339.

*To all whom it may concern:*

Be it known that I, JAMES M. SANDERS, a citizen of the United States, residing at Hillsboro, in the county of Highland and State of Ohio, have invented new and useful Improvements in Auger Bits, of which the following is a specification.

My present invention has reference to certain improvements in augers or boring tools.

My primary object is to produce a wood auger that will bore through a timber without splitting the wood or plugging the hole.

A further object is to produce an auger which may be successfully employed as a counter-sink.

The drawing which accompanies and forms part of this application, illustrates a satisfactory embodiment of the improvement reduced to practice, and wherein:—

Figure 1 is an elevation of an auger in accordance with this invention.

Figure 2 is a plan view thereof looking toward the screw end.

Figure 3 is a fragmentary side elevation of the bit looking toward the same right-angularly with respect to the showing in Figure 1.

Figure 4 is a sectional view on the line 4—4 of Figure 1.

My improved auger includes a shank 1 that has one of its ends formed with a conical enlargement in the nature of a frusto-conical head 5, the reduced outer end of which merging into a tapered screw extension 2. The shank 1 has formed thereon a spiral rib 10 which merges into the head, and the said head is provided upon its opposite faces with angularly disposed grooves 3, the inner wall of one of the grooves merging into the wall of the rib 10 adjacent to said rib. The opposite or outer walls provided by the grooves 3 are sharpened to form cutting edges 6. The end of the head at its juncture with the shank 1 is round in cross section, the grooves 3, of course, passing through this portion of the head. For distinction the opposed walls provided by the upper or rounded portion of the head 5 are indicated in the drawing by the numerals 7 and 8 respectively, the same having their outer ends rounded and sharpened to provide cutting edges 9, the said cutting edges extending beyond the side walls provided by the frusto-conical head proper.

With an auger as above described, it will be seen that both of the bit sections are materially reinforced, that an even cut will be made, that the outer portion of the rounded part of the head is extended cylindrically beyond the base of the conical part of the head on opposite sides of the head defined by the two grooves, and the lower ends of this extension are rounded and sharpened to provide the cutting edges 9.

Having described the invention, I claim:—

An auger bit including a shank having a spiral rib thereon merging into a frusto-conical head, said head having its outer reduced end formed with a tapered screw extension, said head having its opposed faces grooved, one of said grooves being in a line with one of the walls of the rib, the outer edges provided by both of the grooves being sharpened, said head having its inner end round in cross section and intersected by the grooves, the outer portion of the rounded part of the head is extended cylindrically beyond the base of the conical part of the head on opposite sides of the head defined by the two grooves, and the lower ends of this extension are rounded and sharpened to provide the cutting edges, the opposed walls thus provided having their outer edges rounded, sharpened and extending outward of the plane of the frusto-conical head proper.

In testimony whereof I affix my signature.

JAMES M. SANDERS.